United States Patent Office 3,032,540
Patented May 1, 1962

3,032,540
METHOD FOR IMPROVING THE COLOR-STABILITY OF ACRYLONITRILE-STYRENE COPOLYMER
Joseph H. Ross, Jr., and William S. Molnar, South Charleston, W. Va., and Horace E. Riley, Verona, N.J., assignors to Union Carbide Corporation, a corporation of New York
No Drawing. Filed May 20, 1958, Ser. No. 736,461
10 Claims. (Cl. 260—85.5)

The present invention relates to a method for improving the color and color stability of copolymers of acrylonitrile and styrene. More specifically this invention relates to a method for improving the color and color stability of resins in the thermally initiated uncatalyzed copolymerization of acrylonitrile and styrene.

Copolymers of acrylonitrile and styrene or alkyl substituted styrenes have important commercial applications, particularly in the field of impact-resistant molded articles. Color stability is an important property for copolymers used for these molding applications. Because of the inherent tendency of many acrylonitrile copolymers to develop yellow color when heated in the presence of air, many objects prepared from these copolymers must be dyed in various colors.

One method for making acrylonitrile-styrene copolymers is by the liquid phase thermally initiated polymerization without a catalyst at temperatures exceeding about 100° C. and usually between about 100 to 150° C. The reaction is performed in reactors wherein the liquid phase has contact with oxygen from the gas which blankets the top surface of the monomers. The polymerization is characterized by the formation of deposits of tough, solid copolymer on the upper surfaces of the reactor above the liquid phase. This copolymer is formed by polymerization on the walls when the upper space is filled with monomer vapors and the walls are contacted by refluxing monomers. These deposits of copolymer can remain for substantial periods of time and eventually become strongly colored. When one of these colored pieces of copolymer falls into the polymerization mixture of monomers the resulting polymer becomes yellow-colored.

It has now been found that the color and color stability of acrylonitrile-styrene resins can be greatly improved by preventing or greatly diminishing the polymerization and copolymerization of the refluxing monomers or monomer vapors in the upper portions of the reactor and consequently preventing the formation of the deposits of "vapor phase copolymer." This is accomplished by conducting the polymerization in the presence of small amounts of a volatile polymerization inhibitor. The inhibitor can be added to the monomers or monomer prior to the reaction. The inhibitor is vaporized out of the hot liquid monomer and does not inhibit the copolymerization of the monomer mass, but effectively inhibits polymerization in the vapor-filled area over the reacting monomer mass. Thus, the vapor-phase inhibitor, being considerably more volatile than either acrylonitrile or styrene, is concentrated in the vapors and has little effect on the polymerization rate of the liquid monomers. A further advantage of this invention is the elimination of shutdowns which are required to clean the reactors from the copolymer formed above the bulk liquid phase.

The inhibitors used in the novel process of this invention include: organic amines with a boiling point of less than about 100° C., ammonia, and compounds which liberate ammonia at temperatures of less than about 120° C. Examples of these inhibitors include the following compounds: ammonia, ammonium hydroxide, ammonium carbonate, ammonium carbamate, methylamine, dimethylamine, trimethylamine, ethylamine, diethylamine, propylamine, isopropylamine, isobutylamine, and methylisobutylamine. The preferred inhibitors are ammonia, and inorganic ammonium compounds which liberate ammonia at temperatures of less than about 65° C. such as ammonium hydroxide, ammonium carbonate and ammonium carbamate. In the vapor phase the inhibitor is an amine of the general formula $N(R)_3$; wherein R can be hydrogen, a hydrocarbon radical or a mixture of hydrogen and a hydrocarbon radical. The concentration of the inhibitor is not critical since the quantity can vary from trace amounts to concentrations which substantially saturate the atmosphere above the bulk liquid phase with the inhibitor. Concentrations of the inhibitor ranging from about 50 p.p.m. to about 5,000 p.p.m. based on the weight of both monomers is preferred.

The inhibitor can be placed in contact with the reacting monomers in any convenient manner. The gaseous inhibitors can be bubbled into the monomer mixture. Water solutions of the inhibitor such as ammonium hydroxide can be added to the reaction mixture. The inhibitor can be added to either of the monomers or to a diluent if a diluent is used in the reaction. These diluents are inert hydrocarbon such as toluene heptane, or other non-reactive solvents such as methyl ethyl ketone which are employed in concentrations of about 3 to 15 percent of the total weight of the monomers. The inhibitor can also be added to the reactor during the copolymerization reaction. Solid ammonium salts such as ammonium carbonate or ammonium carbamate can be brought into contact with either monomer or the mixture by: physically adding pieces of the solid ammonium salt to the monomer mixture; by trickling either monomer or a mixture of monomers through a tower or column packed with pieces of the solid salt; or by vigorously agitating the monomers with chunks of the solid salts and then decanting off the liquid.

The copolymer can be formed from styrene or lower alkyl substituted styrenes such as alpha-methylstyrene. The concentration of styrenes in the copolymer can vary over a broad range such as 10 to 90 percent styrene by weight with the remainder being acrylonitrile but preferably the styrene content should vary from 60 to 80 percent with 20 percent to 40 percent of acrylonitrile.

The following examples are illustrative of the invention.

*Example 1*

Acrylonitrile and styrene were purified and phenolic inhibitors were removed by slowly passing through a column 100 cm. in length and 1 cm. in diameter packed with activated alumina. Five ml. of acrylonitrile, 10 ml. of styrene and 1.5 ml. of toluene were added to a small glass polymerization tube of about 50 ml. volume. The mixture was carefully purged by bubbling high-purity nitrogen (purity greater than 99.9 percent) through the solution and over the surface for two minutes. The tube was then sealed and placed in a capped section of ¾-inch iron pipe and totally immersed without shaking in an oil bath at a temperature of 110° C. for 48 hours. No catalyst was used. A clear-white hard copolymer was produced. A thick layer of hard crusty copolymer formed over all the inside surface of the tube above the surface of the solid copolymer. The copolymer on the upper walls obviously formed because monomer vapor filled the upper surface and a certain amount of reflux was possible. The tube was cooled and broken and a piece of the solid copolymer product ¾-inch long was placed in a test tube and connected via a standard taper joint and stopcock to a vacuum system. Nitrogen was admitted until a pressure of 50 mm. of mercury was obtained. The tube was then immersed in a bath of silicone oil at 300±5° C. for 10 minutes. The tube was cooled and opened and the heated sample remained colorless. The product of this example is used as a control sample for the subsequent examples. This example also shows that when the copolymerization is conducted in an oxygen free atmosphere the vapor phase copolymer does not have a yellow color.

*Example 2*

Duplicate copolymerizations were conducted identical to those described in Example 1 except that 600 p.p.m. ammonia was added to the charge by adding ammonium hydroxide to the acrylonitrile before filling the polymerization tubes. After the reaction period (48 hours) the upper surface of the tube appeared, to the naked eye, to be free of vapor-phase copolymer. After the tube was opened the heat stability of the product was determined by heating at 300° C. in the manner previously described. The ammonia content before purging was determined in this and in the succeeding examples by titration with perchloric acid. This example shows that ammonia prevents the formation of the vapor phase copolymer.

*Example 3*

Acrylonitrile-styrene copolymers similar to those described in Example 1 were prepared but approximately 1000 p.p.m. of ammonia gas was added immediately before purging by blowing into the acrylonitrile before it was added to the tube. No vapor-phase copolymerization was observed by the eye on the upper walls after 48 hours reaction time. The heat stability of the product was not tested. The concentration of ammonia after purging was not determined. However, in a test of purging a duplicate the concentration remaining in the tube was reduced from 1000 p.p.m. to approximately 600 p.p.m.

*Example 4*

Another batch of copolymer of acrylonitrile and styrene identical to Example 1 was prepared except that 250 p.p.m. of solid ammonium carbonate was added directly to the bomb by adding crystals of ammonium carbonate to the polymerization tube before the monomers were added. Only traces of vapor-phase copolymer were observed. The color of the product remained completely water-white after the 300° C. treatment.

*Example 5*

Purified acrylonitrile was contacted with solid ammonium carbonate by shaking in a bottle with chunks of the solid salt. The concentration of available ammonia as ammonium carbonate was determined to be 600 p.p.m. of ammonium carbonate by titration with perchloric acid. A copolymer similar to that prepared in Example 1 was prepared except that the acrylonitrile contained 600 p.p.m. of alkalinity calculated as available ammonia. No vapor-phase copolymer was observed on the inner walls of the tube after a 48-hour reaction time similar to Example 1. The product also remained completely water-white after the 300° C. stability test.

*Example 6*

Purified acrylonitrile was contacted with ammonium carbonate by passing through a 50 cm. x 1 cm. column packed with the salt. The concentration of dissolved salt (or ammonia) was then adjusted to yield a value of 90 p.p.m. of available ammonia by titration with perchloric acid. This acrylonitrile was then used to prepare a copolymer with styrene similar to that described in Example 1. The amount of vapor-phase copolymer observed was greatly reduced from that observed when no ammonia was present in Example 1. This product also remained completely water-white after heating at 300° C. in the standard heat-stability test previously described.

*Example 7*

A copolymer of acrylonitrile and styrene similar to the one described in Example 1 was prepared but the ratio of monomers was changed to 60 percent by volume acrylonitrile and 40 percent by volume styrene. As in Example 1, when no ammonia or other vapor-phase inhibitor was present, a large amount of copolymer was deposited on the inner walls of the upper surfaces of the tube. This illustrates that the vapor-phase copolymer is produced with ratios of acrylonitrile to styrene other than the more commercially important 30 percent acrylonitrile-70 percent styrene copolymer.

*Example 8*

A copolymer similar to the one described in Example 1 was prepared with 30 percent by volume acrylonitrile and 70 percent by volume styrene except that 500 p.p.m. of amine was added to the acrylonitrile before the monomers were added to the polymerization tube by blowing trimethylamine through the acrylonitrile from a cylinder of trimethylamine. The trimethylamine content was determined by titration with perchloric acid. After the mixture was copolymerized for 48 hours at 110° C. the tube was examined visually for the presence of vapor-phase copolymer. Only traces of vapor-phase copolymer were observed on the walls of the tube. The product was not tested for heat stability by heating at 300° C. in the test previously described.

*Example 9*

A copolymer was produced in a manner exactly like Example 8 except 500 p.p.m. of dimethylamine was bubbled into the acrylonitrile instead of 500 p.p.m. trimethylamine. Very little vapor-phase copolymer was produced. The heat stability of this product was not determined.

What is claimed is:

1. In the thermally initiated, uncatalyzed copolymerization of acrylonitrile and styrene in a liquid phase, at a reaction temperature of at least about 100° C., wherein said copolymerization is carried out in a reaction zone in which said liquid phase is in contact with a vapor phase containing acrylonitrile and styrene monomers, the improvement which comprises introducing into said reaction zone a nitrogen-containing compound selected from the group consisting of ammonia, ammonium hydroxide, ammonium carbonate, ammonium carbamate and the alkyl amines having a boiling point below said reaction temperature, in a concentration of from about 50 parts to about 5,000 parts of the selected nitrogen-containing compound per million parts by weight based upon the total weight of the acrylonitrile and styrene monomers present in said reaction zone, thereby inhibiting the copolymerization of said acrylonitrile and styrene monomers solely and selectively in said vapor phase.

2. The improvement according to claim 1 wherein the selected nitrogen-contaiinng compound is ammonia.

3. The improvement according to claim 1 wherein the selected nitrogen-containing compound is ammonium hydroxide.

4. The improvement according to claim 1 wherein the selected nitrogen-containing compound is ammonium carbonate.

5. The improvement according to claim 1 wherein the selected nitrogen-containing compound is ammonium carbamate.

6. The improvement according to claim 1 wherein the selected nitrogen-containing compound is an alkyl amine having a boiling point of less than 100° C.

7. The improvement according to claim 1 wherein the selected nitrogen-containing compound is trimethylamine.

8. The improvement according to claim 1 wherein the selected nitrogen-containing compound is dimethylamine.

9. In the thermally initiated, uncatalyzed copolymerization of acrylonitrile and styrene in a liquid phase, at a reaction temperature of at least about 100° C., wherein said copolymerization is carried out in a reaction zone in which said liquid phase is in contact with a vapor phase containing acrylonitrile and styrene monomers, the improvement which comprises incorporating ammonia in said vapor phase in a concentration up to the saturation concentration of said ammonia in said vapor phase, thereby inhibiting the copolymerization of said acrylonitrile and styrene monomers solely and selectively in said vapor phase.

10. In the thermally initiated uncatalyzed copolymerization of acrylonitrile and styrene in a liquid phase, at a reaction temperature of at least about 100° C., wherein said copolymerization is carried out in a reaction zone in which said liquid phase is in contact with a vapor phase containing acrylonitrile and styrene monomers, the improvement which comprises incorporating an alkyl amine having a boiling point of less than 100° C. in said vapor phase in a concentration up to the saturation concentration of said alkyl amine in said vapor phase, thereby inhibiting the copolymerization of said acrylonitrile and styrene monomers solely and selectively in said vapor phase.

References Cited in the file of this patent
UNITED STATES PATENTS

| | | |
|---|---|---|
| 2,299,128 | Codd et al. | Oct. 20, 1942 |
| 2,498,694 | Mast | Feb. 28, 1950 |
| 2,679,494 | Thomas | May 25, 1954 |
| 2,793,199 | Kurtz | May 21, 1957 |
| 2,895,938 | Ohlinger et al. | July 21, 1959 |

FOREIGN PATENTS

| | | |
|---|---|---|
| 559,452 | Great Britain | Feb. 21, 1944 |
| 659,771 | Great Britain | Oct. 24, 1951 |

OTHER REFERENCES

Schildknecht: Vinyl and Related Polymers, John Wiley and Sons, Inc., New York, 1952, pages 261–262 relied upon.